(12) United States Patent
Scalise

(10) Patent No.: US 10,989,353 B2
(45) Date of Patent: Apr. 27, 2021

(54) SYSTEM AND METHOD FOR WALL MOUNTING WITH A ROTATING BUSHING

(71) Applicant: David H. Scalise, Morganton, NC (US)

(72) Inventor: David H. Scalise, Morganton, NC (US)

( * ) Notice: Subject to any disclaimer, the term of this patent is extended or adjusted under 35 U.S.C. 154(b) by 101 days.

(21) Appl. No.: 15/859,903

(22) Filed: Jan. 2, 2018

(65) Prior Publication Data
US 2019/0203877 A1 Jul. 4, 2019

(51) Int. Cl.
| F16B 33/02 | (2006.01) |
| F16M 13/02 | (2006.01) |
| F16B 43/00 | (2006.01) |
| F16B 23/00 | (2006.01) |
| F16B 47/00 | (2006.01) |
| F16B 35/00 | (2006.01) |
| F16B 11/00 | (2006.01) |

(52) U.S. Cl.
CPC ......... *F16M 13/02* (2013.01); *F16B 23/0084* (2013.01); *F16B 33/02* (2013.01); *F16B 43/001* (2013.01); *F16B 47/003* (2013.01); *A47K 2201/02* (2013.01); *F16B 11/006* (2013.01); *F16B 35/005* (2013.01); *F16B 2043/008* (2013.01)

(58) Field of Classification Search
CPC .............. E04F 11/1836; E04F 11/1804; E04F 2011/1821; E04F 2011/1829; A47K 10/04; A47K 10/00; A47K 2201/02; E04G 5/06; F16B 23/0084; F16B 33/02; F16B 43/001; F16B 47/003; F16B 11/006; F16B 35/005; F16B 2043/008; F16B 37/041; F16B 12/2036; A47G 1/16; H02G 3/123; F21S 11/007

USPC .... 248/231.91, 226.1, 684, 685, 686, 227.4, 248/544, 546, 547, 216.1, 316.4, 300, 248/200; 211/16, 88.04, 119.009; 52/506.06, 235, 506.08, 506.09, 506.01, 52/506.1, 508
See application file for complete search history.

(56) References Cited

U.S. PATENT DOCUMENTS

| 2,886,278 | A | * | 5/1959 | Opie ................... | E04F 11/1804 |
| | | | | | 248/251 |
| 3,260,021 | A | * | 7/1966 | Katz ....................... | A47K 10/10 |
| | | | | | 52/27 |
| 3,715,850 | A | * | 2/1973 | Chambers ........... | E04F 13/0855 |
| | | | | | 52/701 |
| 4,425,745 | A | * | 1/1984 | Gratz ................. | E04F 13/0853 |
| | | | | | 52/235 |

(Continued)

*Primary Examiner* — Nkeisha Smith
(74) *Attorney, Agent, or Firm* — Nelson Mullins Riley & Scarborough LLP

(57) ABSTRACT

A wall mounting system is provided including a fastening member including one or more mounting studs and one or more anchor apertures. The fastening member is configured to be anchored to a support structure by one or more fasteners disposed through the one or more anchor apertures. The wall mounting system also includes a bushing assembly including an inner portion including a through hole configured to receive a mounting stud and an outer portion configured to rotate about the inner portion and including at least one set screw aperture configured to align with a set screw aperture of an accessory sleeve and receive a set screw. Rotation of the outer portion about the inner portion enables indexing of the set screw aperture about a longitudinal axis of the bushing assembly.

17 Claims, 16 Drawing Sheets

(56) References Cited

U.S. PATENT DOCUMENTS

| | | | | |
|---|---|---|---|---|
| 4,592,332 | A * | 6/1986 | Topping | F41B 5/143 |
| | | | | 124/24.1 |
| 4,700,918 | A * | 10/1987 | Andrasko, Jr. | A47K 3/001 |
| | | | | 211/105.1 |
| 4,715,355 | A * | 12/1987 | Lattig | F41B 5/1438 |
| | | | | 124/44.5 |
| 6,367,219 | B1 * | 4/2002 | Quinlan | E04D 3/3602 |
| | | | | 52/404.2 |
| 7,849,651 | B2 * | 12/2010 | Fujito | E04F 13/0889 |
| | | | | 248/216.1 |
| 8,672,281 | B2 * | 3/2014 | Ernst | E04B 9/18 |
| | | | | 248/327 |
| 9,127,464 | B2 * | 9/2015 | Stearns | E04D 13/10 |
| 9,970,196 | B1 * | 5/2018 | Mao-Cheia | F16B 5/02 |
| 10,405,677 | B2 * | 9/2019 | Cummings | A47F 10/06 |
| 2001/0011443 | A1 * | 8/2001 | Watanabe | E04F 13/0816 |
| | | | | 52/506.05 |
| 2008/0078904 | A1 * | 4/2008 | Trimble | E04F 11/1804 |
| | | | | 248/251 |
| 2008/0217271 | A1 * | 9/2008 | Walter | A47F 5/0815 |
| | | | | 211/89.01 |
| 2012/0145854 | A1 * | 6/2012 | Smith | A47K 10/10 |
| | | | | 248/226.11 |
| 2015/0361671 | A1 * | 12/2015 | Honein | E04F 11/1804 |
| | | | | 248/217.4 |
| 2016/0138269 | A1 * | 5/2016 | Stearns | E04D 13/10 |
| | | | | 52/60 |

\* cited by examiner

SYSTEM AND METHOD FOR WALL MOUNTING WITH A ROTATING BUSHING

Example embodiments generally relate to wall mounting and more particularly to a system and method for wall mounting with a rotating bushing.

BACKGROUND OF THE INVENTION

A large variety of accessory items may be mounted to walls throughout workplaces and homes for functional or decorative purposes, such as partition walls, hooks, shelves, handles, pulls, shower doors, grab bars, seats, baskets, luggage racks, towel racks, shower rods, or the like. Typically, mounting of these accessory items to the wall includes drilling one or more holes into a wall to insert one or more anchor screws. The accessory items may then be mounted to the wall by the one or more anchor screws directly, through a portion of the accessory item, or via a mounting plate. However, drilling holes into the wall may create an entry point for water and moisture, which is not conducive for wet surface applications, such as bathrooms, kitchens, showers, and the like. Moisture entry may cause degradation of the wall, mold, mildew, or other undesired results. Additionally, the strength of the mounting may be dependent on the material that the anchor screws are inserted into. For example, if the anchor screw is inserted into a low strength material, such as plaster, fiber board, drywall, panel board, or the like, the anchor and therefore accessory item may have a low hold strength, such as less than five lbf. Wall anchors, anchors, such as expanding anchors or helical anchors may increase the hold strength of an anchor screw inserted into a low strength material to a value sufficient to hold low weight items exerting five to forty lbf. Anchor screws inserted into a high strength material, such as a wall stud may have a higher hold strength, such as fifty lbf, but rely on one or a few penetrating anchor points. The individual attachment points of the one or more anchor screws may create force concentration areas in the wall material and/or the accessory item when under load, which may cause the wall material and/or the accessory item deform or fail.

SUMMARY OF THE INVENTION

In an example embodiment wall mounting system with a rotating bushing is provided for mounting of accessories. The wall mounting system may include a fastening member anchored to one or more wall studs and integrated into the wall façade, such as tile, to create a single monolithic load bearing structure. The wall mounting system transfers mechanical load applied to the accessory item across the wall mounting system to multiple adhesive and/or anchor points of the fastening member, instead of the single penetrating anchor point. Additionally, since the accessory items are mounted to the fastening member, instead of the wall, anchor screws with machine threads may be used between the accessory item and the mounting stud, which may increase the surface area of the connection, as compared to anchor screws with wood threads. The distribution of mechanical load across the wall mounting system and increased contact area of the mounting connection may enable a hold strength up to, or exceeding, 1175 to 2800 lbf.

The fastening member may be a Z bar configured, such that a first projection is anchored to the wall stud, or similar support structure, under a construction board layer and that a second projection is disposed externally to the construction board layer. The Z bar is fully integrated into the wall using adhesive, such as epoxy, mortar, or the like over the second projection and the construction board and under a façade layer, which further enables the high hold strength. Further, since the Z bar is mounted under the façade and integrated into the wall, only mounting studs may extend through the façade for mounting the accessory item. The integration of the Z bar into the wall also enables strategic dimensioning and precise alignment of mounting locations. This may include center to center anchoring points for grab bars, seating and shower doors partition walls, or other accessory items. The wall mounting system may also pre-locate an accessory item mount within a wall structure to avoid penetrations into waterproofed seals and systems. The ability to predetermine the dimensions, alignment and location of mounting locations within the wall structure may be particularly beneficial in complying with building codes, such build codes for mounting of wall partitions.

In some mounting systems, the mounting studs may have a round circumference, which may allow the accessory item to rotate about the mounting stud when a force is applied to the accessory item, which may not be desirable in some applications. To prevent rotation of the accessory item about a mounting stud, some mounting studs may include ridges or grooves which are configured to engage corresponding grooves or ridges in a bushing disposed between the mounting stud and an accessory sleeve of the accessory item. A set screw then may be screwed through a set screw aperture in both the bushing and the accessory sleeve. This set screw and grove and ridge engagement may prevent rotation of the accessory item, but cause machining tolerances for the grooves and ridges of bushing and stud mounts to be significantly small to enable proper alignment of the set screw apertures.

The wall mounting system provided includes a rotating bushing assembly. The rotating bushing assembly may include an inner portion, configured to engage a mounting stud, and an outer portion configured to rotate about the inner portion. The outer portion may include a set screw aperture, which may be indexed 360 degrees about the bushing assembly by rotation of the outer portion about the inner portion to enable alignment with a set screw aperture in an accessory sleeve at any position about the circumference of the accessory sleeve. The ability to index the set screw aperture of the bushing assembly enables flexibility of the wall mounting system to accept accessory items with various set screw placement on their respective accessory sleeves. Using vertically down as a relative 0 degree position, the wall mounting system may accept accessory sleeves with set screw apertures at 0 degrees, 15 degrees, 30 degrees, 90 degrees, 180 degrees, or any other offset position. Additionally, the ability to index the set screw aperture of the bushing assembly may also enable larger machine tolerances or remove the machine tolerances for alignment of the set screw apertures of the bushing assembly and accessory sleeve, especially for accessories with multiple mounting points, such as grab bars, partition walls, seats, or the like.

Accordingly, example embodiments may enable wall mounting of one or more accessory items, as described below. In one example embodiment, a wall mounting system is provided including a fastening member including one or more mounting studs and one or more anchor apertures. The fastening member is configured to be anchored to a support structure by one or more fasteners disposed through the one or more anchor apertures. The wall mounting system also includes a bushing assembly including an inner portion including a through hole configured to receive a mounting stud and an outer portion configured to rotate about the inner portion and including at least one set screw aperture configured to align with a set screw aperture of an accessory sleeve and receive a set screw. Rotation of the outer portion about the inner portion enables indexing of the set screw aperture about a longitudinal axis of the bushing assembly.

In another example embodiment, a bushing assembly is provided including an inner portion including a through hole, configured to receive a mounting stud disposed on a fastener member anchored to a wall, and an outer portion configured to rotate about the inner portion and including at least one set screw aperture configured to align with a set screw aperture of an accessory sleeve and receive a set screw. Rotation of the outer portion about the inner portion enables indexing of the set screw aperture about a longitudinal axis of the bushing assembly.

In a further example embodiment, a method of using a wall mounting system is provided including anchoring a fastening member to a support structure. The fastening member includes one or more mounting studs and one or more anchor apertures and fastening member is anchored to the support structure by one or more fasteners disposed through the one or more anchor apertures. The method also includes installing a bushing assembly on a mounting stud. The bushing assembly includes an inner portion including a through hole configured to receive a mounting stud and an outer portion configured to rotate about the inner portion and including at least one set screw aperture configured to align with a set screw aperture of an accessory sleeve and receive a set screw. Rotation of the outer portion about the inner portion enables indexing of the set screw aperture about a longitudinal axis of the bushing assembly. The method also includes inserting the bushing assembly into the accessory sleeve, aligning the set screw aperture in the bushing assembly with the set screw aperture in the accessory sleeve, and installing a set screw in the set screw apertures of the bushing assembly and accessory sleeve

BRIEF DESCRIPTION OF THE DRAWINGS

Figure 1:
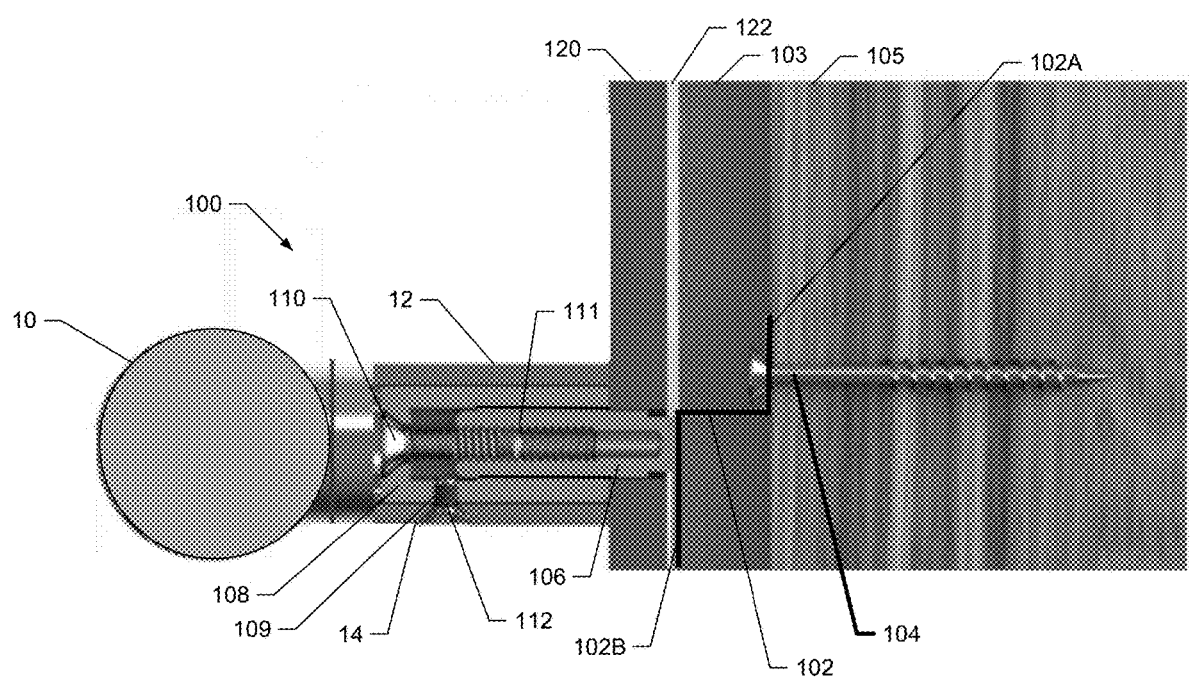
Figure 8A:
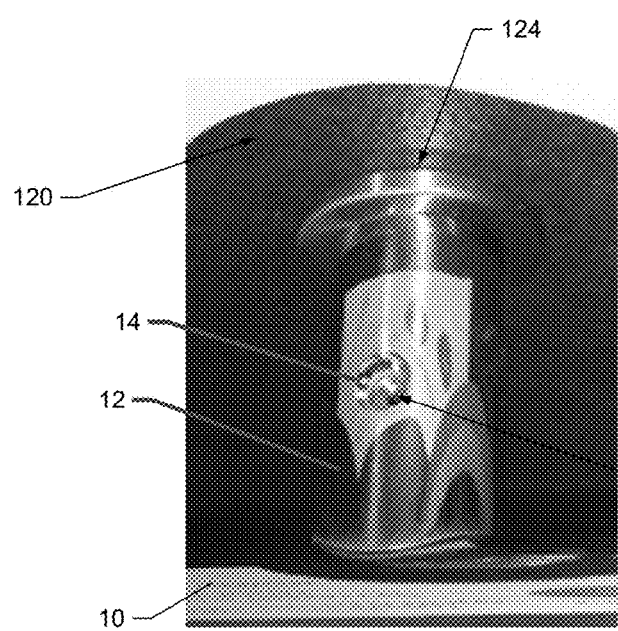
Figure 8B:
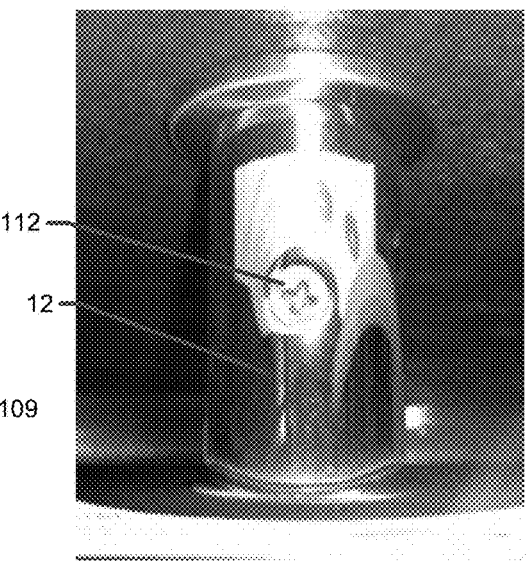
Figure 9:
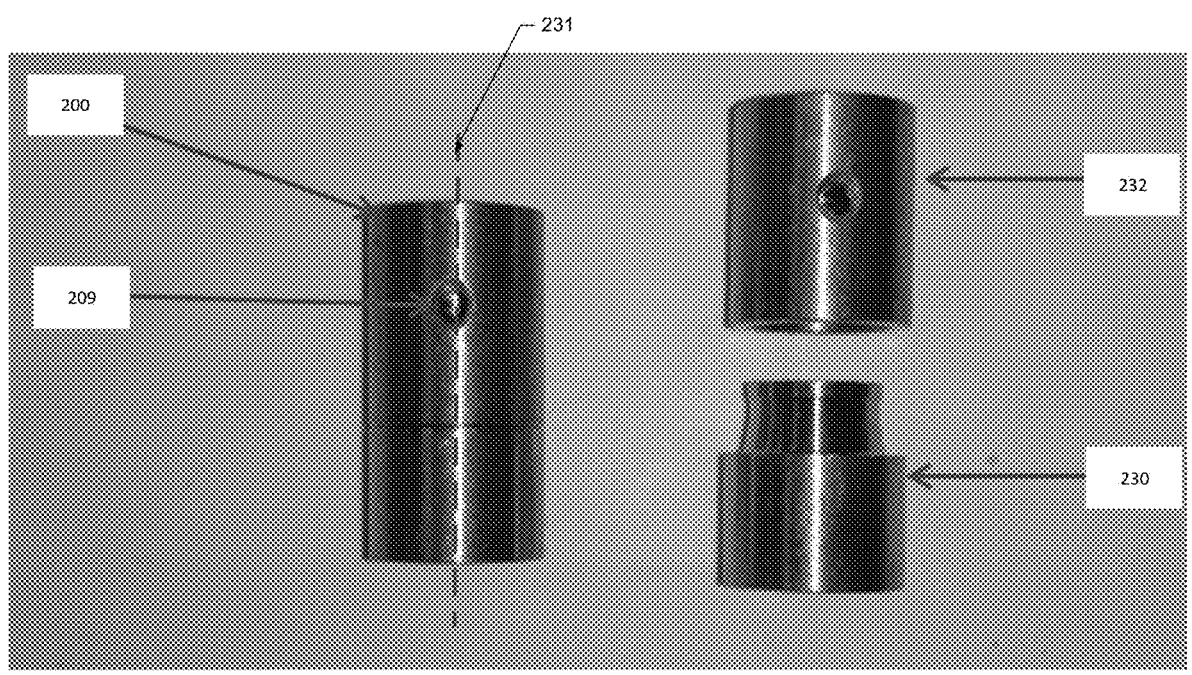
Figure 10A:
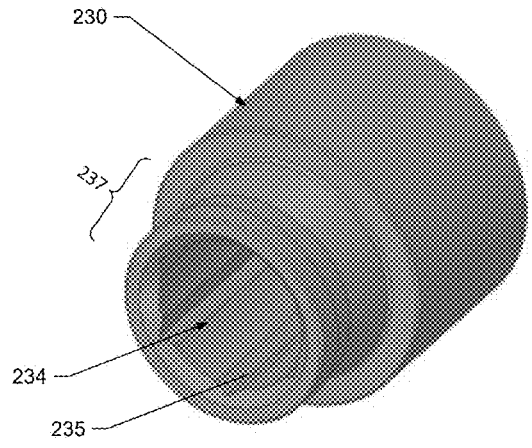
Figure 10B:
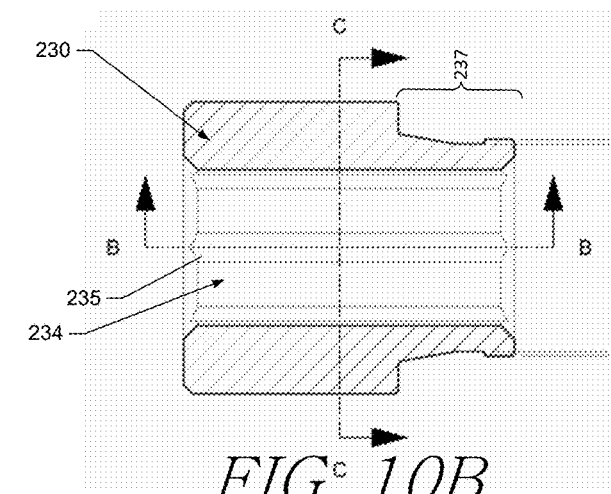
Figure 11A:
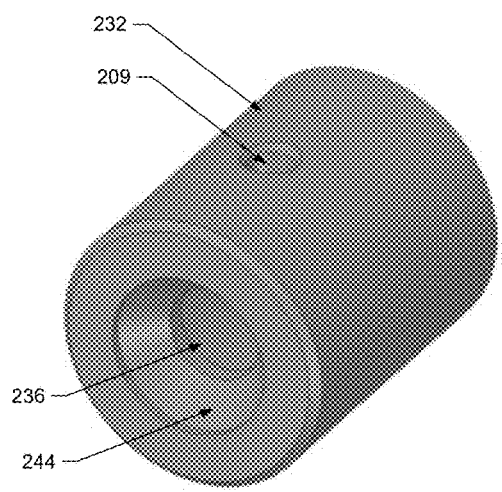
Figure 12A:
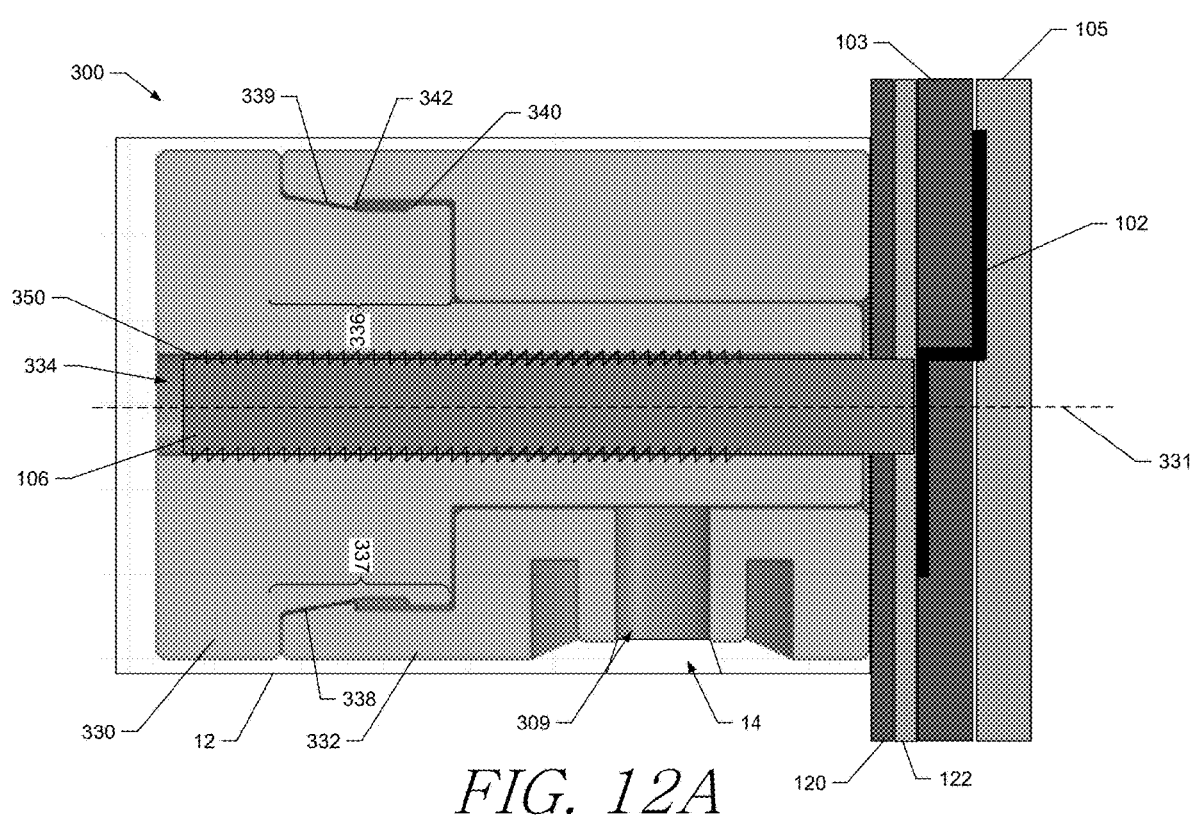
Figures 12B, 12C:
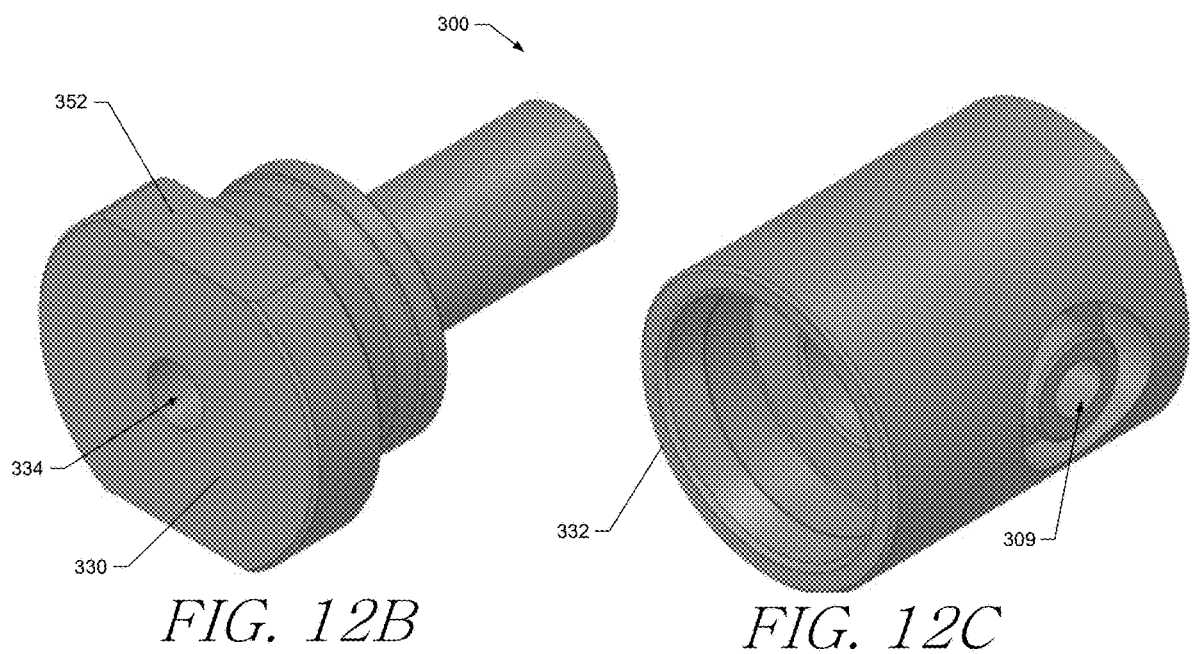
Figure 13:
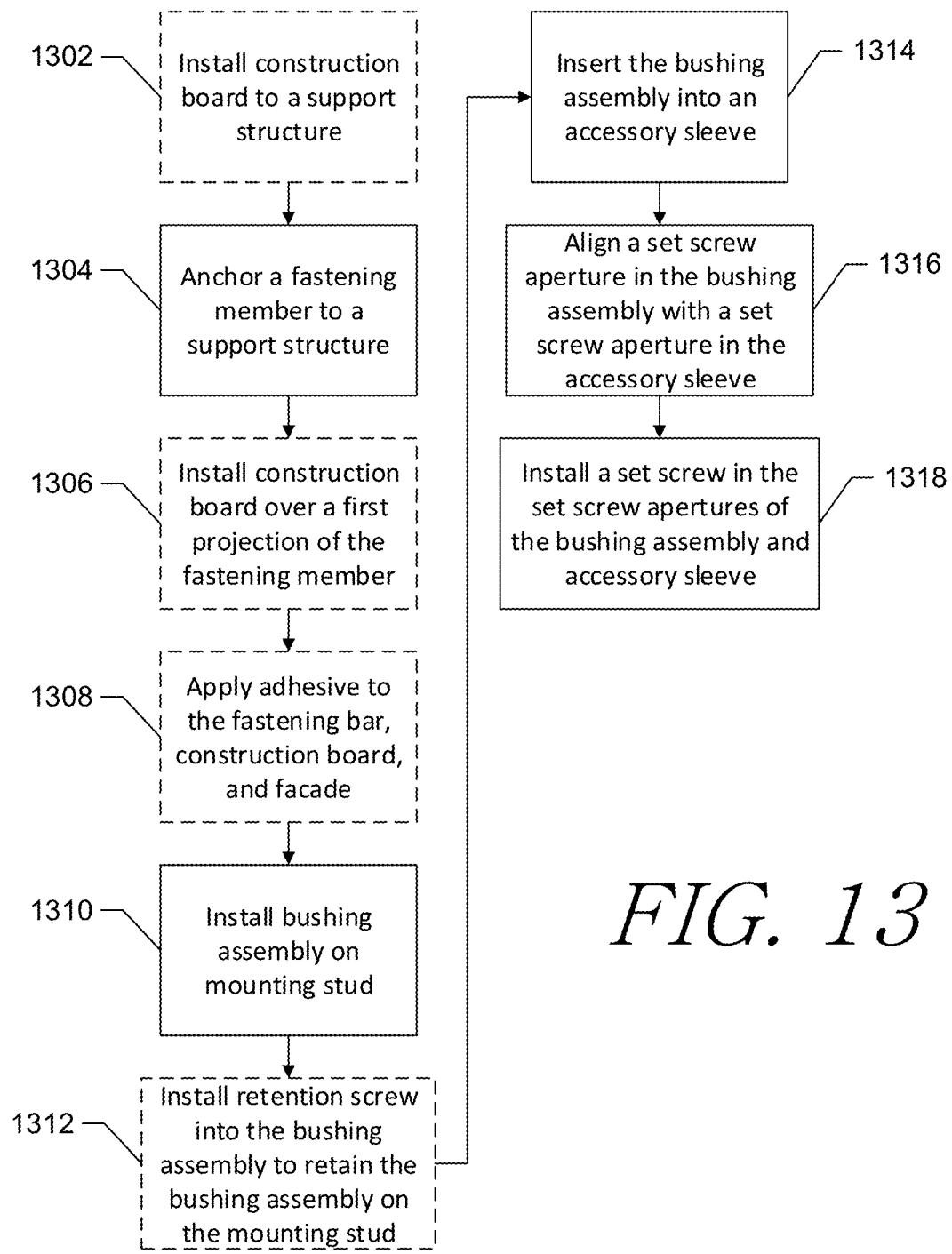

Having thus described the wall mounting system in general terms, reference will now be made to the accompanying drawings, which are not necessarily drawn to scale, and wherein:

FIG. 1 illustrates an example cross sectional view of a wall mounting system according to an example embodiment;

FIGS. 2-7 illustrate installation of an example grab bar installation using a wall mounting system according to the example embodiment;

FIG. 8A depicts alignment of a bushing set screw aperture aligned with an accessory sleeve set screw aperture according to the example embodiment;

FIG. 8B depicts a set screw installed in the set screw apertures depicted in FIG. 8A according to the example embodiment;

FIG. 9 illustrates an example bushing assembly according to an example embodiment;

FIG. 10A illustrates a perspective view of a inner portion of the bushing assembly according to the example embodiment;

FIGS. 10B-E illustrate cross-sectional views of a inner portion of a bushing assembly according to the example embodiment;

FIG. 11A illustrates a perspective view of a outer portion of a bushing assembly according to an example embodiment;

FIGS. 11B-E illustrate a plurality of cross-sectional views of an outer portion of a bushing assembly according to an example embodiment;

FIGS. 12A-12C illustrates another example bushing assembly according to an example embodiment; and FIG. 13 illustrates a flowchart of example methods of installing an accessory item using a wall mounting system according to some embodiments discussed herein.

Repeat use of reference characters in the present specification and drawings is intended to represent same or analogous features or elements of the invention according to the present disclosure.

DESCRIPTION OF THE PREFERRED EMBODIMENTS

Some example embodiments now will be described more fully hereinafter with reference to the accompanying drawings, in which some, but not all, example embodiments are shown. Indeed, the examples described and pictured herein should not be construed as being limiting as to the scope, applicability or configuration of the present disclosure. It will be apparent to those skilled in the art that modifications and variations can be made in such example embodiments without departing from the scope or spirit thereof. For instance, features illustrated or described in one embodiment may be used on another embodiment to yield a still further embodiment. Thus, it is intended that the present invention covers such modifications and variations as come within the scope of the appended claims, their equivalents, and the present disclosure. Like reference numerals refer to like elements throughout.

As used herein, terms referring to a direction or a position relative to the orientation of the wall mounting system and related apparatus, such as but not limited to "vertical," "horizontal," "upper," "lower," "above," or "below," refer to directions and relative positions with respect to the apparatus's orientation in its normal intended operation, as indicated in the FIGs. herein. Thus, for instance, the terms "vertical" and "upper" refer to the vertical direction and relative upper position in the perspectives of the FIGs. and should be understood in that context, even with respect to an apparatus that may be disposed in a different orientation.

Further, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be understood to mean "one or more" unless specified otherwise or clear from the context to be directed to a singular form. Throughout the specification and claims, the following terms take at least the meanings explicitly associated therein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment" or other similar phrase, as used herein, does not necessarily refer to the same embodiment, although it may.

Example Wall Mounting System

FIG. 1 illustrates a wall mounting system 100 for mounting one or more accessory items 10 to a wall. The accessory item 10 may include, without limitation, partition walls, hooks, shelves, handles, pulls, shower doors, grab bars, seats, baskets, luggage racks, towel racks, shower rods, or the like. The accessory item 10 may include an accessory sleeve 12, such as a cylindrical tube, configured to be mounted to the wall by the wall mounting system 100, as described below.

The wall mounting system 100 may include a fastening member, such as a Z bar 102. The Z bar 102 may include a first projection 102A and a second projection 102B. The Z bar 102 may be formed from steel, such as stainless steel, aluminum, rigid polymers, or the like. The second projection may be disposed over a layer of construction board 103 and the first projection 102A may be disposed under the layer of construction board 103, a lateral portion of the Z bar 102 may be disposed between portions of the construction board 103. The construction board 103, may include concrete board, fiber board, drywall, foam core, or the like configured to provide a base wall structure for a façade.

The first projection 102A may include one or more anchor apertures configured to receive a fastener 104, such as a wood screw, masonry screw, or the like. The fastener 104 may pass through the anchor aperture into a support structure 105 of a wall, such as a wall stud, masonry, or the like. A head of the fastener 104 anchors the Z bar 102 to the support structure 105 by retaining the Z bar in connection with the support structure 105.

The second projection 102B may include one or more anchor studs 106 which project substantially perpendicularly from the wall. The anchor stud 106 may be formed of steel, such as stainless steel, aluminum, rigid polymers, or the like. A façade 120, such as tiles composed of ceramic, porcelain, stone, glass, polymer, or the like, antimicrobial tiles, wall paneling, or other suitable façade materials, may be applied to construction board 103 over the second projection 102B of the Z bar 102, such as by applying an adhesive 122, such as mortar, epoxy, grout, or the like. The adhesive 122 may connect the façade 120 to the construction board 103 and/or the second projection 102B, generating a single interconnected load bearing structure. This interconnected structure, which is both unitized and monolithic, distributes mechanical load applied to the accessory item 10 across the adhesive connections between the construction board 103 and the Z bar 102 and the anchor connections between the fasteners 104 of the Z bar 102. The distribution of mechanical load across the wall mounting system 100 may enable a hold strength up to, or exceeding, 1175 to 2800 lbf.

A bushing assembly 108 may be configured to receive the mounting stud 106 in a through hole, discussed further below, and receive the accessory sleeve 12 about an outer circumference. The bushing assembly 108 may provide a mechanical connection between the accessory sleeve 12 and the mounting stud 106.

The mounting stud 106 may include one or more ridges or grooves, such as a hexagonal outer perimeter, a keyed projection or the like configured to be complementary to one or more ridges or recesses in the through hole of the bushing assembly 108. The complementary ridges or recesses may prevent or limit rotation of the bushing assembly 108 about the mounting stud 106. The wall mounting system 100 may also include a retention element, such as a retention screw 110. The retention screw 110 may include threads, such as machine threads complementary to a set of threads disposed in a mounting hole 111 in the mounting stud 106. The retention screw 110 may retain the bushing assembly 108 on the mounting stud 106, such as by providing axial restraint to the bushing assembly 108 through the engagement of the complementary threads, and or engagement of a screw head of the retention screw 110 against the bushing assembly 108, when a force is applied away from the mounting stud 106.

Alternatively, the mounting stud 106 and the bushing assembly 108 may include complementary threads, e.g. machine threads, such that the bushing assembly is screwed onto the mounting stud 106 without a retention screw 110. The complementary threads of the bushing assembly 108 and mounting stud 106 may retain the bushing assembly 108 on the mounting stud 106 by providing axial restraint to the bushing assembly 108 through the engagement of the complementary threads, when a force is applied away from the mounting stud 106.

Since the accessory items 10 are mounted to the Z bar 102 machine threads may be used between the bushing assembly 108 and the mounting stud 106, which may increase the surface area of the connection, as compared to anchor screws with wood threads used in traditional mounting, which are connected directly to the wall. The increased contact area of the mounting connection may also increase the hold strength of the wall mounting system, as compared to traditional mounting.

Turning to the connection of the accessory sleeve 12 to the bushing assembly 108, the bushing assembly 108 may be inserted into the accessory sleeve 12. The accessory sleeve 12 may include a set screw aperture 14 and the bushing assembly 108 may include a set screw aperture 109. The set screw aperture 109 of the bushing assembly 108 may be aligned with the set screw aperture 14 of the accessory sleeve 12. A set screw 112 may be installed into the set screw aperture 109 of the bushing assembly 108 and the set screw aperture 14 of the accessory sleeve 12, such as by engaging complementary threads of the set screw 112 and the set screw aperture 109 of the bushing assembly 108 and the set screw aperture 14 of the accessory sleeve 12. Although discussed as a threaded screw herein, the set screw 112 may be a rivet, pin, or other suitable fastener.

In some embodiments, the bushing assembly 108 may be a rotating bushing assembly such as bushing assembly 200 illustrated in FIGS. 9-11E or bushing assembly 300 illustrated in FIGS. 12A-12C. The rotating bushing assembly may enable rotation of a portion of the bushing assembly 108, such that the set screw aperture 112 may be indexed about a longitudinal axis of the bushing assembly. In an example embodiment, the indexing of the set screw aperture 112 of the bushing assembly 108 is enabled in 360 degrees. The ability to index the set screw aperture 112 of the bushing assembly 108 increases flexibility of the wall mounting system 100 to accept accessory items 10 with various placements of set screw apertures 14 on their respective accessory sleeves 12. Using vertically down as a relative 0 degree position, the wall mounting system 100 may accept accessory sleeves 12 with set screw apertures 14 at 0 degrees, 15 degrees, 30 degrees, 90 degrees, 180 degrees, or any other offset position. Additionally, the ability to index the set screw aperture 112 of the bushing assembly 108 may also enable larger machine tolerances or remove the machine tolerances to provide alignment of the set screw aperture 14 of the accessory sleeve 12 and the set screw aperture 112 of the bushing assembly 108, especially for accessories with multiple mounting studs, such as grab bars, partition walls, or the like.

Example Installation of a Wall Mounting System

Figure 2:
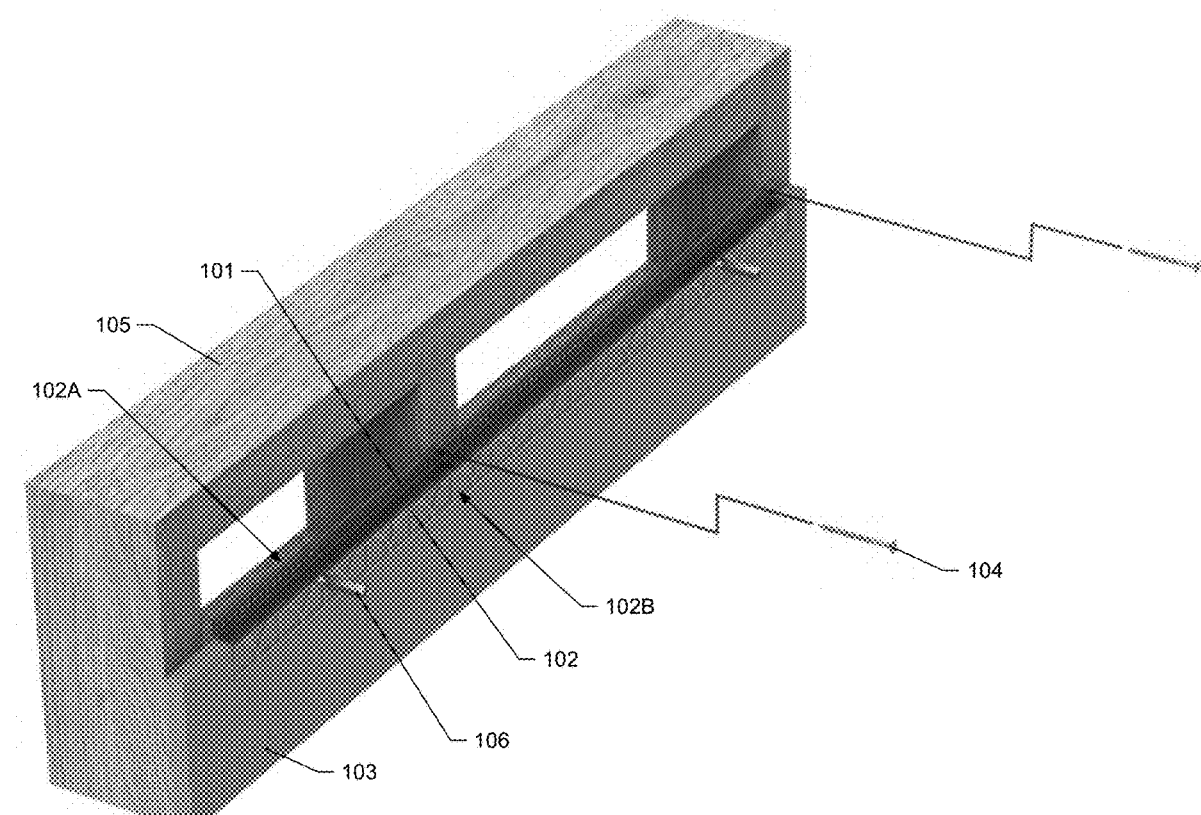
Figure 3:
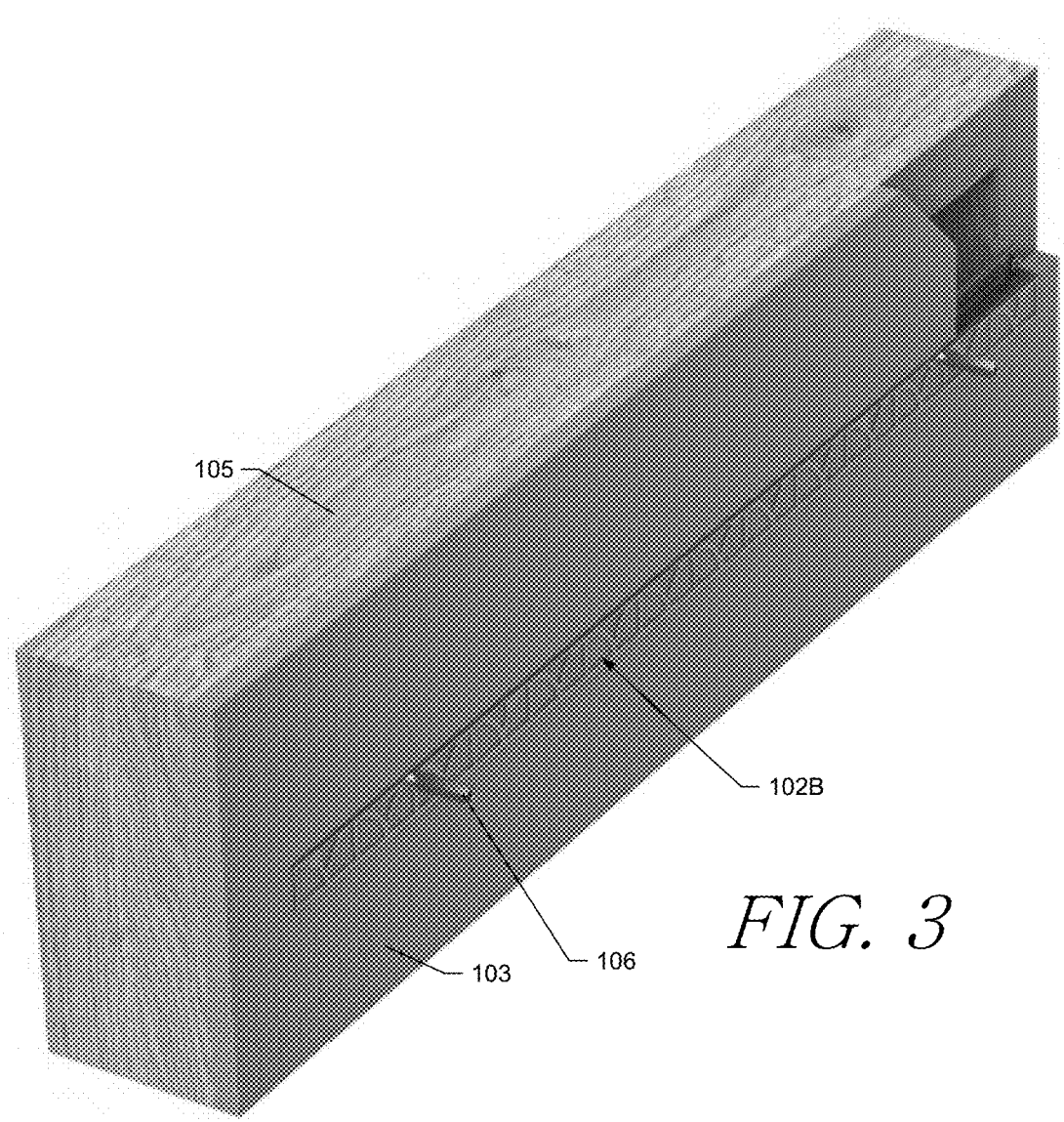
Figure 4:
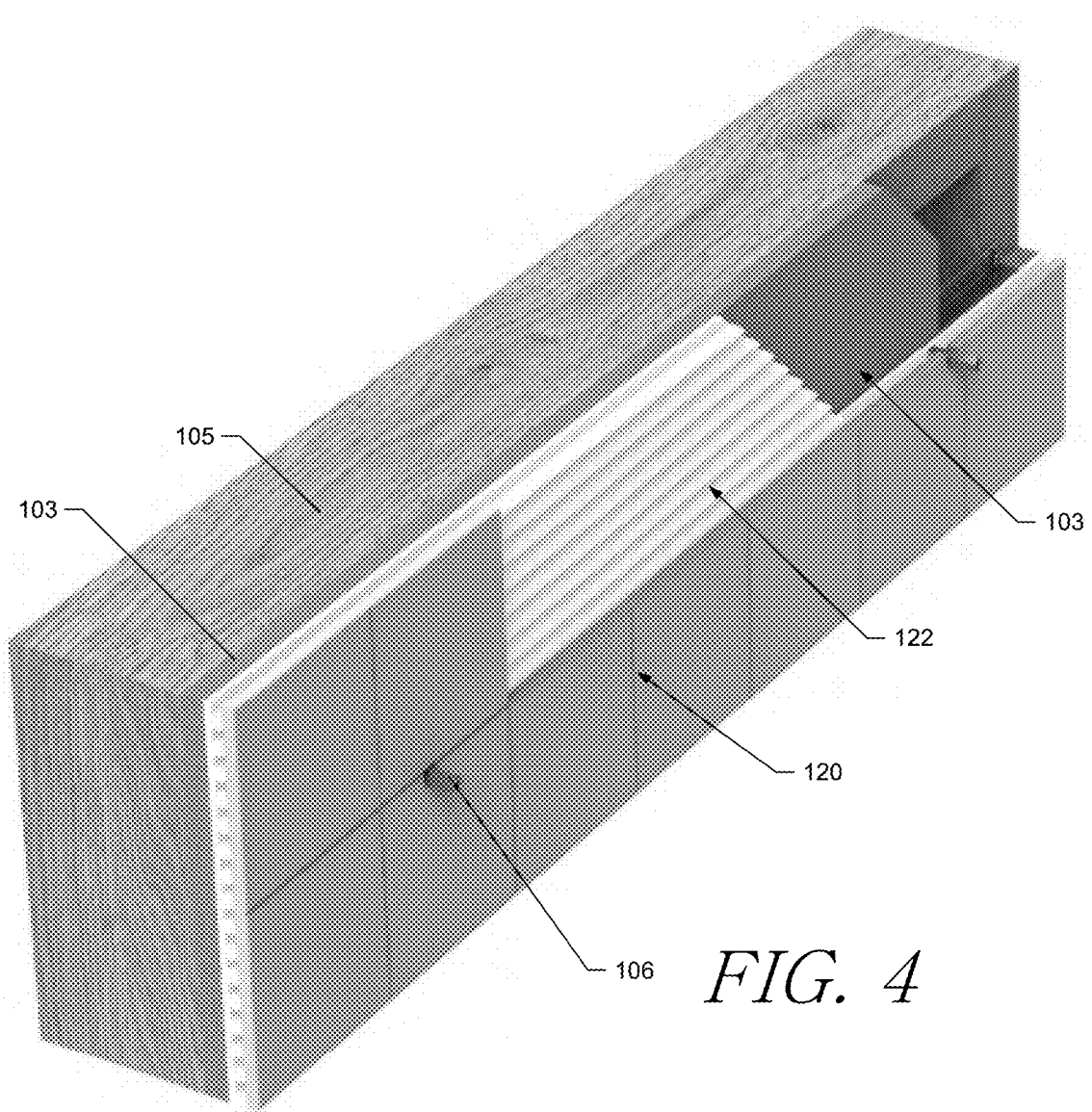

FIGS. 2-7 illustrate installation of an example grab bar installation using a wall mounting system 100 according to the example embodiment. As illustrated in FIG. 2, a construction board 103 has been installed on a portion of the support structure 105, which here is a wood wall stud. The Z bar 102 is positioned on the edge of the construction board 103 such that the first projection 102A abuts the support structure 105 and the second projection 102B is over the construction board 103. In embodiments, in which the wall mounting system 100 is installed in a wet environment, such as a bathroom, shower, kitchen, or the like a bead of waterproofing caulk, such as urethane or silicone, may be applied to an underside and a top side of the Z bar 102. One or more fasteners 104 are installed through one or more anchor apertures 101 in the Z bar into the support structure, which are repeating circular perforations along the first projection in the depicted example. In the depicted embodiment, the fasteners 104 are two inch wood screws. In FIG. 3, a construction board 103 has been installed over the first projection 102A of the Z bar, such that only the second projection 102B of the Z bar 102 and mounting studs 106 are visible. In embodiments in which the wall mounting system 100 is installed in a wet environment, a waterproof membrane layer, e.g. a liquid membrane, such as liquid rubber, or a sheet membrane, such as a PVC, CPE, oriented HDPE sheets, may be applied over the construction board 103. The second projection 102B of the Z bar may include a lattice structure or mesh, which is illustrates as a "pie shaped" or quarter circle perforations in the depicted embodiment, enabling the adhesive 122 to be applied to both the lattice structure and the constructions board 103, as depicted in FIG. 4 below, thereby attaching the second projection 102B to the construction board.

FIG. 4 depicts application of the adhesive 122 and façade 120 to the surface of the construction board 103 over the second projection 102B of the Z bar. In the depicted example, the façade 120 is a ceramic tile and the adhesive is thin-set mortar and/or grout. The adhesive 122 may permeate and set in the lattice structure between the façade 120 and the construction board 103. In instances in which the façade 120 would cover a mounting stud 106, the façade 120 may be cut or drilled to provide a through hole for the mounting stud 106. The adhesive 122 around the mounting stud 106 provides density and compressive strength to the mounting stud on the exposed face of the façade 120.

Figure 5:
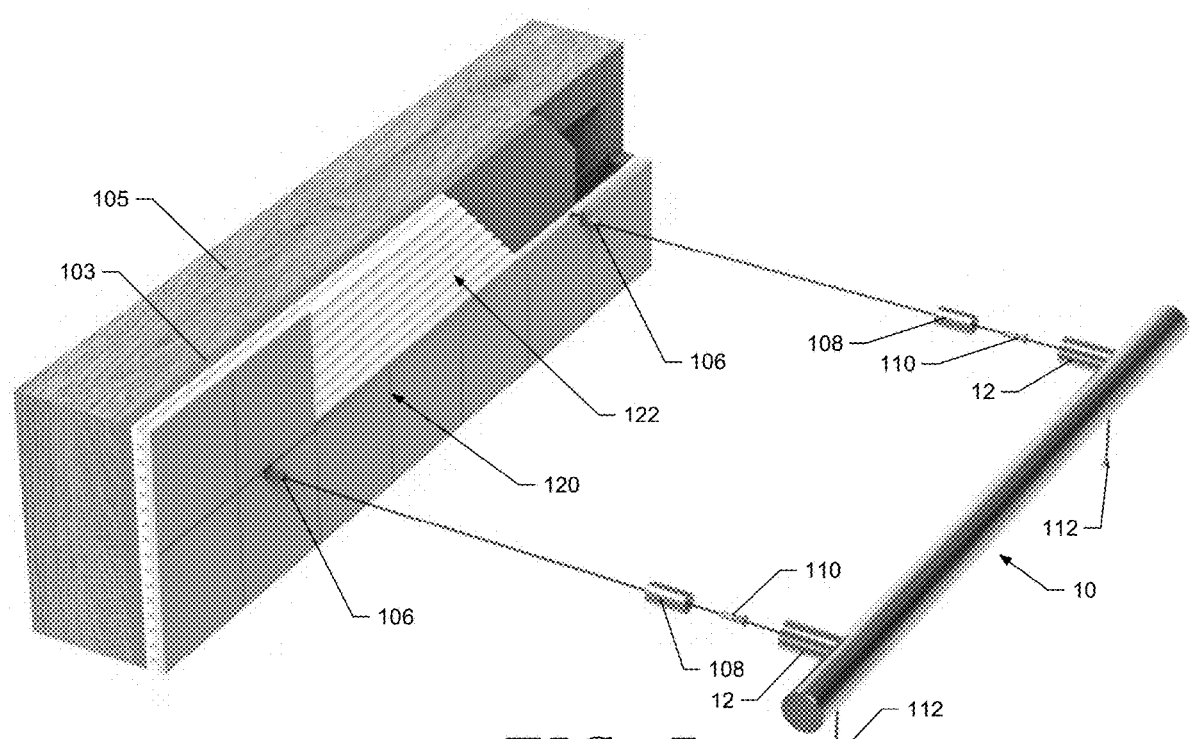
Figure 6:
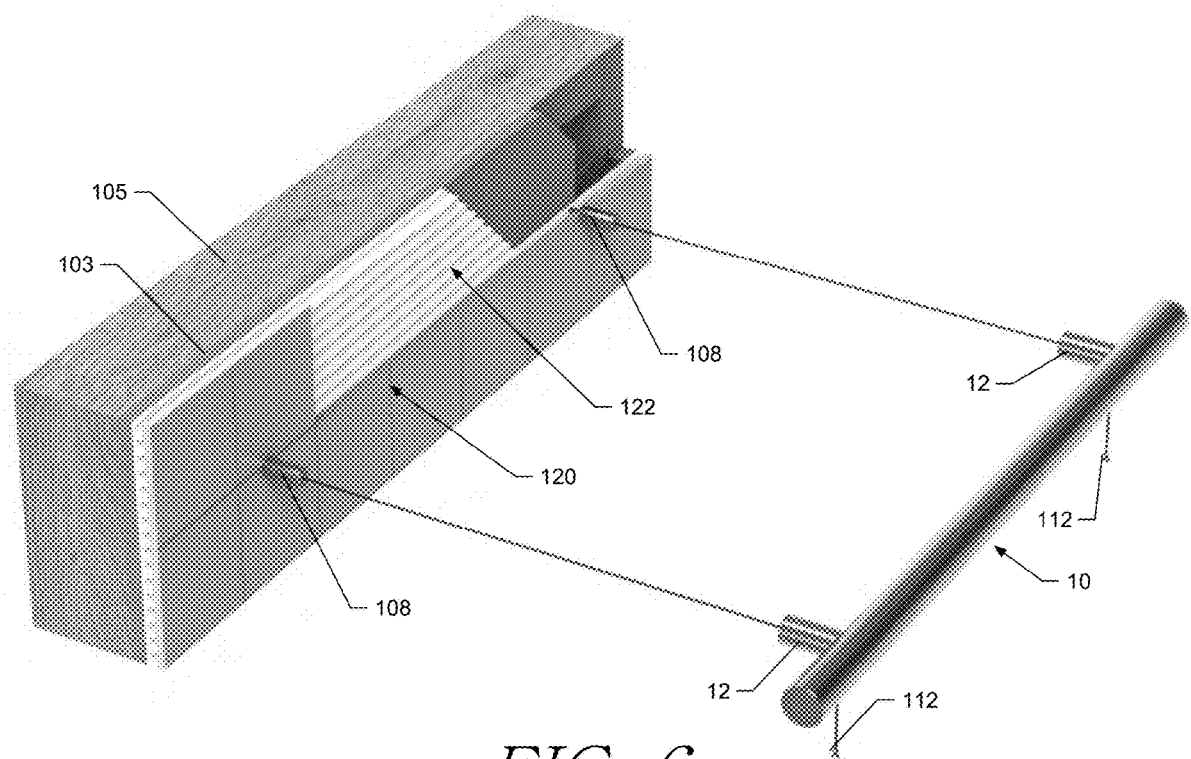

FIGS. 5 and 6 depict the installation of bushing assemblies 108 on the mounting studs 106. In some embodiments, a cover washer 124 may be installed between the bushing assembly 108 and the façade 120 about the mounting stud 106, as depicted in FIG. 8A. The recesses and/or ridges of the bushing assembly 108 and mounting stud 106 may be aligned and the bushing assembly 108 pushed onto the mounting stud 106, such that at least a portion of the mounting stud 106 penetrates the through hole of the bushing assembly 108. The retention screw 110 is then inserted through the bushing assembly and screw into the complementary threads of the mounting stud 106, thereby retaining the bushing assembly 108 axially engaged with the mounting stud 106.

Figure 7:
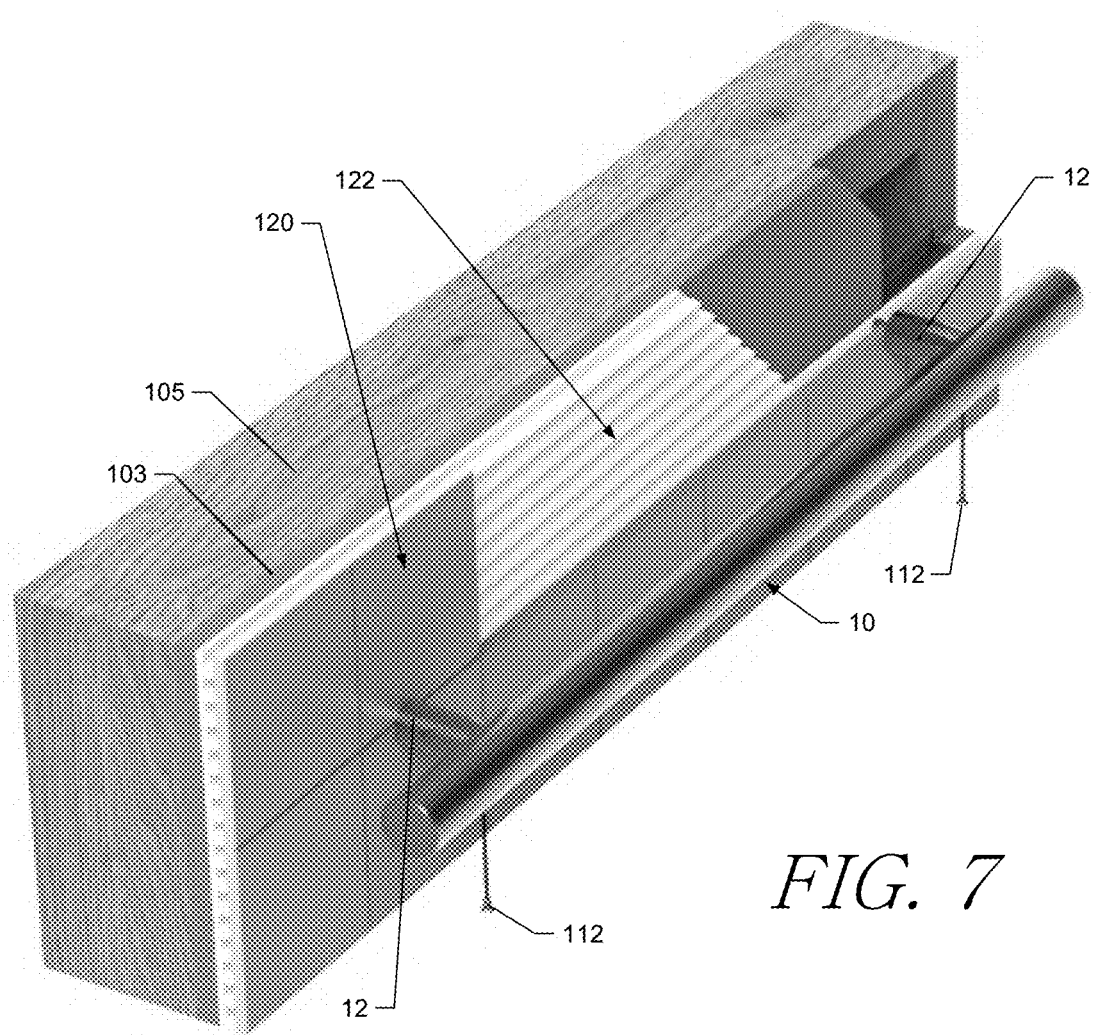

Turning to FIG. 7, the accessory sleeves 12 of the accessory item 10, here a grab bar, may be positioned such that the bushing assembly 108 is received within the accessory sleeve 12. The set screw aperture 109 of the bushing assembly 108 is aligned with the set screw aperture 14 of the accessory sleeve 12, as depicted in FIG. 8A. A set screw 112 is then installed into the set screw aperture 109 of the bushing assembly 108 and the set screw aperture 14 of the accessory sleeve 12, as depicted in FIG. 8B.

Example Rotating Bushing Assemblies

FIG. 9 illustrates an example rotating bushing assembly 200 according to an example embodiment. The rotating bushing assembly 200 includes an inner portion 230 and an outer portion 232. The inner portion 230 includes a through hole 234 (FIG. 10A) configured to receive the mounting stud 106 (FIG. 1). The outer portion 232 includes a set screw aperture 209. The outer portion 232 is configured to rotate about the inner portion 230, such that rotation of the outer portion about the inner portion enables indexing of the set screw aperture 209 about a longitudinal axis 231 of the bushing assembly 200.

FIG. 10A illustrates a perspective view of the inner portion 230 of the bushing assembly 200 and FIGS. 10B-E illustrate a plurality of cross-sectional views of the inner portion 230 of a bushing assembly 200. FIG. 11A illustrates a perspective view of the outer portion 232 of the bushing assembly 200 and FIGS. 11B-E illustrate a plurality of cross-sectional views of the outer portion 232 of a bushing assembly 200. As discussed above, the inner portion 230 includes the through hole 234 configured to receive the mounting stud 106. In the depicted embodiment, the mounting stud 106 may include a plurality of triangular ridges or have a substantially hexagonal exterior surface. As such, the through hole 234 includes a plurality of recesses 235 configured to be complementary to the exterior surface of the mounting stud 106.

Figure 10C:
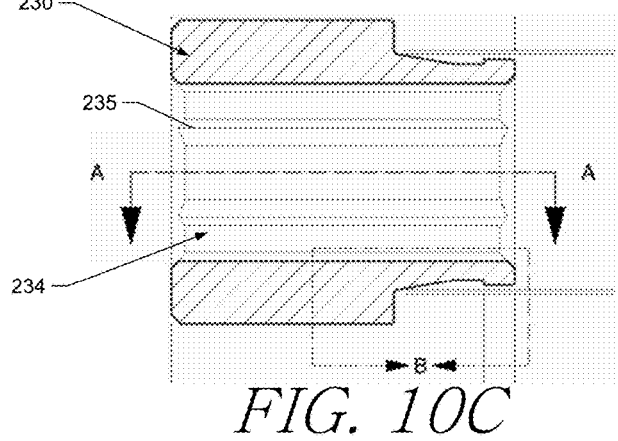
Figure 10D:
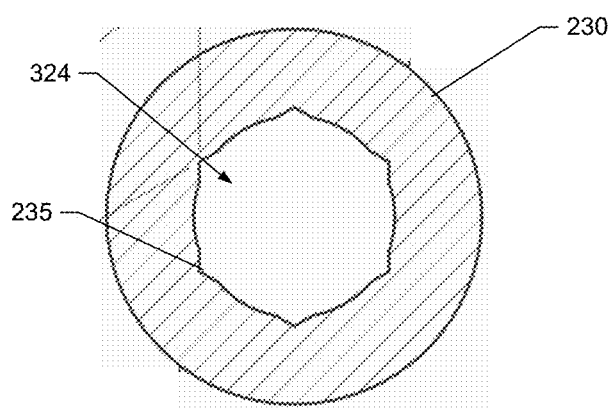
Figure 10E:
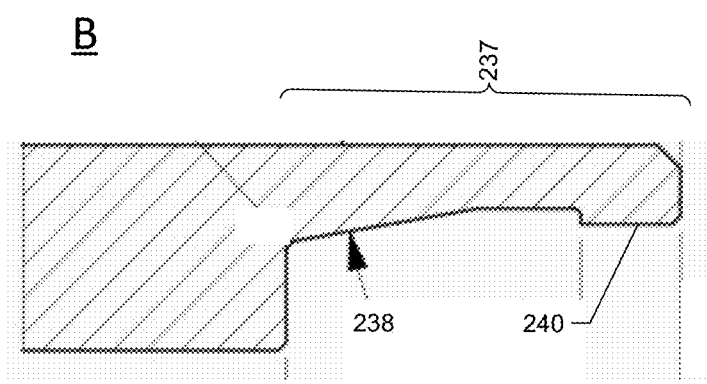
Figure 11B:
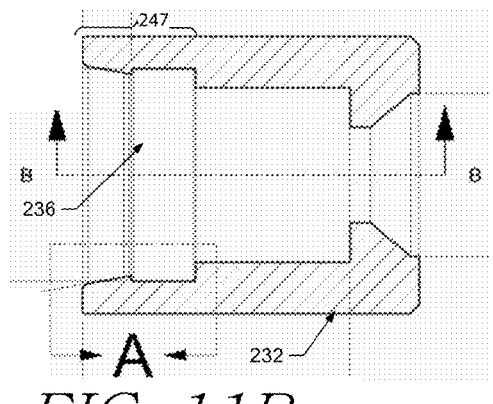
Figure 11C:
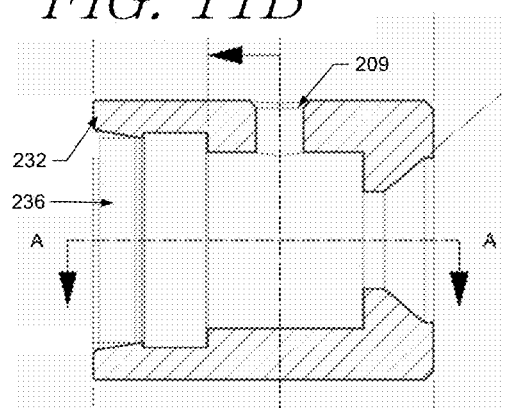
Figure 11D:
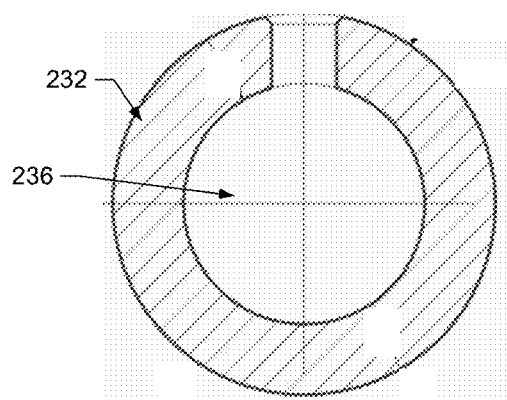
Figure 11E:
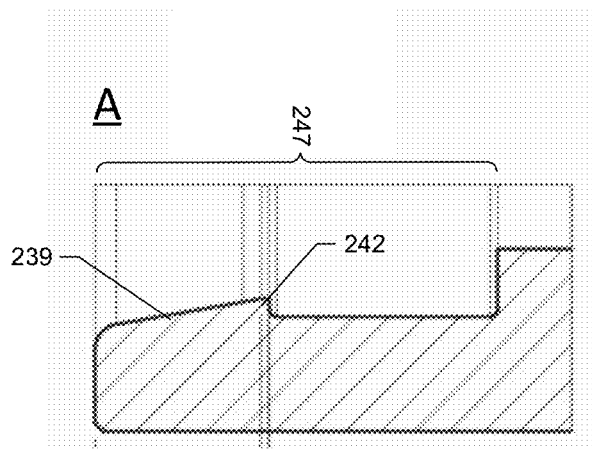

The outer portion 232 includes a through hole 236 configured to receive at least a portion of the inner portion 230 of the bushing assembly 200. At least a portion of the outer diameter of the inner portion 230, e.g. an insertion portion 237 (Detail B of FIG. 10C depicted in FIG. 10E) is smaller than at least a portion of the inner circumference of the outer portion 232 of the bushing assembly 200, such that the portion of the inner portion 230 with the smaller circumference may be inserted into a receiving portion (Detail A of FIG. 11B depicted in FIG. 11E) the outer portion 232 of the bushing assembly 200.

In some example embodiments, insertion portion 237 of the inner portion 230 of the bushing assembly 200 includes a beveled edge 238 disposed about an outer circumference of the insertion portion 237. The receiving portion 247 of the outer portion 232 of the bushing assembly 200 also includes a beveled edge 239 disposed about an internal circumference, which is complementary to the beveled edge 238 of the insertion portion 237. When a force exerted, such as by tightening of retention screw, forces the outer portion 232 toward the inner portion 230, the outer portion 232 is axially aligned with the inner portion 230 by the alignment of the beveled edges 238, 239.

In an example embodiment, insertion portion 237 of the inner portion 230 of the bushing assembly 200 includes a locking tab 240 disposed about an external circumference and the receiving portion 247 of the outer portion 232 of the bushing assembly 200 includes a locking tab 242 disposed about an inner circumference. The inner portion 230 and outer portion 232 of the bushing assembly 200 may be press fit, such that the locking tabs 240 the insertion portion pass through and are subsequently retained within the locking tabs 242 of the receiving portion 247, thereby resisting disengagement of the inner portion 230 from the outer portion 232.

In some embodiments, the outer portion may include a countersink 244 complementary to a head of the retention screw 110. The countersink 244 may enable the retention screw 110 to be installed with the exposed portion of the head flush to the outer portion 232 of the bushing assembly 200.

FIGS. 12A-12C illustrates example bushing assembly 300 according to another example embodiment. The bushing assembly 300 includes an inner portion 330 and an outer portion 332. The outer portion 332 is configured to rotate about the inner portion 330, such that rotation of the outer portion 332 about the inner portion 330 enables indexing of a set screw aperture 309 about a longitudinal axis 331 of the bushing assembly 300. In the example embodiment discussed above in regard to FIGS. 9-11E, the bushing assembly 200 is disposed on the mounting stud 106 such that the inner portion 230 is in contact with the wall, e.g. façade 120 or optionally a cover-washer 124. In the example embodiment discussed in FIGS. 12A-12C, the bushing assembly 300 is disposed on the mounting stud 106 such that the outer portion 332 is in contact with the wall or optional cover-washer.

In an example embodiment, the through hole 334 of the inner portion 330 of the bushing assembly 300 may include threads 350, such as machine threads, complementary to threads disposed on an external surface of the mounting stud 106. In this embodiment, the inner portion 330 may be rotated to screw the inner portion 330 onto the mounting stud 106 by engagement of the complementary threads. As such, a retention screw 110, as used in the previous bushing assembly 200, may not be necessary to connect the inner portion 330 to the mounting stud 106. The complementary threads 350 disposed directly between the inner portion 330 and the mounting stud may increase the contact surface area, which may increase the holding strength of wall mounting. This configuration may be particularly beneficial in high load weight applications, such as seat, shower doors and partition walls mountings.

In some example embodiments, the inner portion may include a tool head 352 configured to receive rotational force from a tool, such as a wrench. The tool head 352 may include one or more flat sides, such as two opposing flat sides as depicted in the example embodiment. The tool head 352 may receive the rotational force from the tool and convert the rotational force into a linear force by the threads 350 of the inner portion 330 and the mounting stud 106.

In some example embodiments, an insertion portion 336 of the inner portion 330 of the bushing assembly 300 includes a beveled edge 338 disposed about an outer circumference of the insertion portion 336. The receiving portion 337 of the outer portion 332 of the bushing assembly 300 also includes a beveled edge 339 disposed about an internal circumference, which is complementary to the beveled edge 338 of the insertion portion 336. When a force exerted, such as by tightening of the inner portion 330 onto the mounting stud 106, forces the outer portion 332 toward the inner portion 330, the outer portion 332 is axially aligned with the inner portion 330 by the alignment of the beveled edges 338, 339.

In an example embodiment, insertion portion 336 of the inner portion 330 of the bushing assembly 300 includes a locking tab 340 disposed about an external circumference and the receiving portion 337 of the outer portion 332 of the bushing assembly 300 includes a locking tab 342 disposed about an inner circumference. The inner portion 330 and outer portion 332 of the bushing assembly 300 may be press fit, such that the locking tabs 340 the insertion portion 336 pass through and are subsequently retained within the locking tabs 342 of the receiving portion 337, thereby resisting disengagement of the inner portion 330 from the outer portion 332.

As discussed above, the wall mounting system 100 provided herein may include numerous benefits over standard mounting systems. For example, the wall mounting system 100 is configured to transfer mechanical load applied to an accessory item across the wall mounting system to multiple adhesive and/or anchor points of the fastening member, instead of the single penetrating anchor point. Additionally, since the accessory items are mounted to the mounting member, e.g. Z bar, instead of the wall, anchor screws with machine threads may be used between the accessory item and the mounting stud, which may increase the surface area of the connection, as compared to anchor screws with wood threads. The distribution of mechanical load across the wall mounting system and increased contact area of the mounting connection may enable a hold strength up to, or exceeding, 1175 to 2800 lbf. The integration of the Z bar 102 into the wall, such that only the mounting studs 106 extend through the façade 120 for mounting the accessory item 10, provides density and compressive strength to the mounting stud 106, which does not introduce any water permeable penetration in the wall. The ability to index the set screw aperture 209, 309 of the bushing assembly 200, 300 enables flexibility of the wall mounting system to accept accessory items 10 with various set screw placement on their respective accessory sleeves 12. Additionally, the ability to index the set screw aperture 209, 309 of the bushing assembly 200, 300 may also enable larger machine tolerances or remove the machine tolerances for alignment of the set screw apertures 209, 309 of the bushing assembly 200, 300 and the set screw apertures 14 of the accessory sleeve 12, especially for accessories items 10 with multiple mounting points, such as partition walls, hooks, shelves, handles, pulls, shower doors, grab bars, seats, baskets, luggage racks, towel racks, shower rods, or the like Example Flowchart(s) and Operations FIG. 7 illustrates a flowchart according to example methods installing an accessory item using a wall mounting system according to one or more of the example embodiments discussed above. The method may include anchoring a fastening member to a support structure at operation 1304, installing a bushing assembly on a mounting stud at operation 1310, inserting the bushing assembly into an accessory sleeve at operation 1314, aligning a set screw aperture in the bushing assembly with a set screw aperture in the accessory sleeve at operation 1316, and installing a set screw in the set screw apertures of the bushing assembly and accessory sleeve at operation 1318.

In some embodiments, the method may include additional, optional operations, and/or the operations described above may be modified or augmented. Some examples of modifications, optional operations, and augmentations are described below, as indicated by dashed lines, such as, Installing construction board to a portion of a support structure at operation 1302, installing construction board over a first projection of the fastening member at operation 1306, applying adhesive to the fastening bar, construction board and façade at operation 1308, and installing a retention screw into the bushing assembly to retain the bushing assembly on the mounting stud at operation 1312.

In some embodiments, the wall mounting system may be further configured for optional modifications. In this regard, the indexing of the set screw aperture is 360 degrees. In an example embodiment, the through hole includes one or more recesses or ridges configured to be complementary to one or more recesses or ridges disposed on an external surface of the mounting stud. In some example embodiments, the wall mounting system also includes a retention screw configured to retain the bushing assembly on the mounting stud. In an example embodiment, the inner portion also includes a beveled edge about an outer circumference of the inner portion and the outer portion also includes a beveled edge about an internal circumference, which is complementary to the beveled edge of the inner portion, such that when a force exerted by tightening of the retention screw forces the outer portion toward the inner portion, the outer portion is axially aligned with the inner portion by alignment of the respective beveled edges. In some example embodiments, the through hole includes threads configured to be complementary to threads disposed on an external surface of the mounting stud. In an example embodiment, the inner portion also includes a tool head configured to receive rotational force from a tool. The rotational force is converted to linear force by the threads of the inner portion and the mounting stud. In some example embodiments, the inner portion also includes a beveled edge disposed about an outer circumference of the inner portion and the outer portion comprises a beveled edge disposed about an internal circumference, which is complementary to the beveled edge of the inner portion, such that when a force exerted by tightening of the inner portion forces the outer portion toward the inner portion, the outer portion is axially aligned with the inner portion by alignment of the respective beveled edges. In an example embodiment, the fastening member includes a Z bar including first projection and a second projection. The first projection of the Z bar includes the one or more anchor apertures. In some example embodiments, the first projection of the Z bar is configured to be disposed under a construction board layer of a wall and a second projection of the Z bar is configured to be disposed over the construction board layer. In an example embodiment, the second projection of the Z bar includes a lattice structure enabling an adhesive to be applied to both the lattice structure and the constructions board, thereby attaching the second projection to the construction board. In some example embodiments, wherein the inner portion comprises a locking tab disposed about an outer circumference and the outer portion comprises a locking tab disposed about an inner circumference, such that, when press fit, the locking tabs resist disengagement of the inner portion from the outer portion.

CONCLUSION

In some example embodiments, the wall mounting system may be further configured for optional modifications. In this regard, for example, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A wall mounting system comprising:
    a fastening member comprising one or more mounting studs and one or more anchor apertures, wherein the fastening member is configured to be anchored to a support structure by one or more fasteners disposed through the one or more anchor apertures; and
    a bushing assembly comprising:
        an inner portion comprising a through hole configured to receive a mounting stud; and
        an outer portion configured to rotate about the inner portion and comprising at least one set screw aperture configured to align with a set screw aperture of an accessory sleeve and receive a set screw;
    wherein rotation of the outer portion about the inner portion enables indexing of the set screw aperture about a longitudinal axis of the bushing assembly.

2. The wall mounting system of claim 1, wherein the indexing of the set screw aperture is 360 degrees.

3. The wall mounting system of claim 1, wherein the through hole comprises one or more recesses or ridges configured to be complementary to one or more recesses or ridges disposed on an external surface of a mounting stud.

4. The wall mounting system of claim 1 further comprising:
    a retention screw configured to retain the bushing assembly on a mounting stud.

5. The wall mounting system of claim 4, wherein the inner portion further comprises a beveled edge disposed about an outer circumference of the inner portion and the outer portion further comprises a beveled edge disposed about an internal circumference, which is complementary to the beveled edge of the inner portion, such that when a force exerted by tightening of the retention screw forces the outer portion toward the inner portion, the outer portion is axially aligned with the inner portion by alignment of the respective beveled edges.

6. The wall mounting system of claim 1, wherein the through hole comprises threads configured to be complementary to threads disposed on an external surface of a mounting stud.

7. The wall mounting system of claim 6, wherein the inner portion comprises a tool head configured to receive rotational force from a tool, wherein the rotational force is converted to linear force by the threads of the inner portion and the mounting stud.

8. The wall mounting system of claim 7, wherein the inner portion further comprises a beveled edge disposed about an outer circumference of the inner portion and the outer portion comprises a beveled edge disposed about an internal circumference, which is complementary to the beveled edge of the inner portion, such that when a force exerted by tightening of the inner portion forces the outer portion toward the inner portion, the outer portion is axially aligned with the inner portion by alignment of the respective beveled edges.

9. The wall mounting system of claim 1, wherein the fastening member comprises a Z bar comprising first projection and a second projection, wherein the first projection of the Z bar comprises the one or more anchor apertures.

10. The wall mounting system of claim 9, wherein the first projection of the Z bar is configured to be disposed under a construction board layer of a wall and a second projection of the Z bar is configured to be disposed over the construction board layer.

11. The wall mounting system of claim 10, wherein the second projection of the Z bar comprises a lattice structure enabling an adhesive to be applied to both the lattice structure and the construction board, thereby attaching the second projection to the construction board.

12. The wall mounting system of claim 1, wherein the inner portion comprises a locking tab disposed about an outer circumference and the outer portion comprises a locking tab disposed about an inner circumference, such that, when press fit, the locking tabs resist disengagement of the inner portion from the outer portion.

13. A bushing assembly comprising:
an inner portion comprising a through hole configured to receive a mounting stud disposed on a fastener bar anchored to a wall; and
an outer portion configured to rotate about the inner portion and comprising at least one set screw aperture configured to align with a set screw aperture of an accessory sleeve and receive a set screw;
wherein rotation of the outer portion about the inner portion enables indexing of the set screw aperture about a longitudinal axis of the bushing assembly, and
wherein the inner portion further comprises a beveled edge disposed about an outer circumference of the inner portion and the outer portion further comprises a beveled edge disposed about an internal circumference, which is complementary to the beveled edge of the inner portion, such that when a force exerted by tightening of a retention screw forces the outer portion toward the inner portion, the outer portion is axially aligned with the inner portion by alignment of the respective beveled edges.

14. The bushing assembly of claim 13, wherein the indexing of the set screw aperture is 360 degrees.

15. The bushing assembly of claim 13, wherein the through hole comprises threads configured to be complementary to threads disposed on an external surface of the mounting stud, the inner portion comprises a tool head configured to receive rotational force from a tool, and wherein the rotational force is converted to linear force by the threads of the inner portion and the mounting stud.

16. The bushing assembly of claim 15, wherein the inner portion further comprises a beveled edge disposed about an outer circumference of the inner portion and the outer portion comprises a beveled edge disposed about an internal circumference, which is complementary to the beveled edge of the inner portion, such that when a force exerted by tightening of the inner portion forces the outer portion toward the inner portion, the outer portion is axially aligned with the inner portion by alignment of the respective beveled edges.

17. The bushing assembly of claim 13, wherein the inner portion comprises a locking tab disposed about an outer circumference and the outer portion comprises a locking tab disposed about an inner circumference, such that, when press fit, the locking tabs resist disengagement of the inner portion from the outer portion.

* * * * *